United States Patent
Brown et al.

(10) Patent No.: US 10,440,181 B1
(45) Date of Patent: Oct. 8, 2019

(54) ADAPTIVE REAL-TIME CONVERSATIONAL SYSTEMS AND METHODS

(71) Applicant: RingDNA, Inc., Sherman Oaks, CA (US)

(72) Inventors: Howard A. Brown, Los Angeles, CA (US); Jeffrey K. Shelton, Los Angeles, CA (US); Jason Ouellette, San Francisco, CA (US); Kanwar Saluja, Los Angeles, CA (US)

(73) Assignee: RINGDNA, INC., Sherman Oaks, CA (US)

( * ) Notice: Subject to any disclaimer, the term of this patent is extended or adjusted under 35 U.S.C. 154(b) by 0 days.

(21) Appl. No.: 16/429,321

(22) Filed: Jun. 3, 2019

(51) Int. Cl.
*H04M 3/51* (2006.01)
*G06Q 30/02* (2012.01)
*G06N 20/00* (2019.01)

(52) U.S. Cl.
CPC ...... *H04M 3/5175* (2013.01); *G06Q 30/0281* (2013.01); *H04M 3/5183* (2013.01); *G06N 20/00* (2019.01)

(58) Field of Classification Search
CPC .............. H04M 3/5175; H04M 3/5183; G06Q 30/0281; G06N 20/00
USPC ................................ 379/265.06, 266.01, 309
See application file for complete search history.

(56) References Cited

U.S. PATENT DOCUMENTS

2017/0345416 A1* 11/2017 Bangalore ........... G10L 15/1822
2018/0183929 A1*  6/2018 Fang .................... H04M 3/5175

* cited by examiner

*Primary Examiner* — Quynh H Nguyen
(74) *Attorney, Agent, or Firm* — Ansari Katiraei LLP; Arman Katiraei; Sadiq Ansari

(57) ABSTRACT

An adaptive conversational system may simultaneously monitor multiple active calls or ongoing voice or telephone conversations, may extract a different set of conversation elements from a current point in each conversation in real-time as each conversation proceeds, may determine different rules that apply to current points of different ongoing conversations based on the extracted conversation elements satisfying different rule triggers, and may control different conversations at different times according to actions of different rules that are applied at different times to different conversations. The system may selectively control the conversations when the conversations become non-compliant, deviate from best practices, or can be controlled to more effectively reach a positive disposition than when allowing a telephone agent to independently control the conversation. The system may use machine learning and/or artificial intelligence to define rules based on tracked actions that are produce a positive disposition more effectively than existing rules.

20 Claims, 11 Drawing Sheets

ADAPTIVE REAL-TIME CONVERSATIONAL SYSTEMS AND METHODS

BACKGROUND INFORMATION

Telephone agents are a critical component of many businesses. Telephone agents place outbound telephone calls and receive inbound telephone calls in order to generate sales, provide service and support, provide information to market products and services of a business, and/or perform other functions of a business via live conversation.

Training telephone agents may be time and cost intensive for any business. Supervisors may identify and teach best practices to telephone agents. Supervisors may also review telephone agent performance, and may coach or changing behavior of the telephone agents as the business evolves and changes. Accordingly, as the number of telephone agents grows, so too does the number of supervisors need to train, review, and/or coach the telephone agents.

In some cases, calls of some or all telephone agents may be monitored for compliance and/or quality control purposes. However, compliance and quality control monitoring may be effectively impossible with humans, as there may be one supervisor for a large number of telephone agents, and each supervisor may be able to monitor a mere fraction of the calls and/or other activities of the telephone agents under that supervisor's oversight.

DETAILED DESCRIPTION OF PREFERRED EMBODIMENTS

The following detailed description refers to the accompanying drawings. The same reference numbers in different drawings may identify the same or similar elements.

Systems and methods, as provided herein, provide simultaneous monitoring of multiple ongoing voice or telephone conversations, determine rules that apply to current points of different ongoing conversations, and control those ongoing conversations from their respective current points based on one or more actions defined by an applied rule. More specifically, some embodiments provide an adaptive conversational system that can provide real-time monitoring of every second of every call and/or conversation made by different telephone agents, whether the calls occur in parallel or at different times, in order to dynamically control each call and/or conversation based on any detected noncompliance, deviation from best practices, and/or triggers for changing the conversation to more effectively reach a positive disposition.

The adaptive conversational system may log when and which rules are applied to different calls and/or conversations. Based on the real-time monitoring and logged results, the adaptive conversational system may determine the effectiveness of the implemented controls in satisfying compliance requirements, satisfying the best practices, and/or in completing workflows with a positive disposition. Adaptive conversational system may then use machine learning and/or artificial intelligence to continually modify the rules and corresponding controls. The machine learning and/or artificial intelligence thereby improves the effectiveness of each rule which, in turn, increases or maximizes the number of conversations that yield desired dispositions.

To further improve the disposition of each call or conversation, the adaptive conversational system may provide predictive call routing. In some such embodiments, the adaptive conversational system may monitor call dispositions reached by telephone agents on different calls, and may monitor the parameters of those calls. The parameters may span the call purpose, the call subject, the caller location, the caller history, and/or other information. Based on the monitoring, the adaptive conversational system may predictively route new calls with different sets of parameters to the telephone agents that have best disposed calls with the same sets of parameters. In particular, the adaptive conversational system may detect a new call, may detect parameters of the new call, and may route the new call to a telephone agent that has the highest likelihood of reaching a positive disposition for calls with the same parameters based on positive dispositions reached on prior calls with the same parameters.

Figure 1:
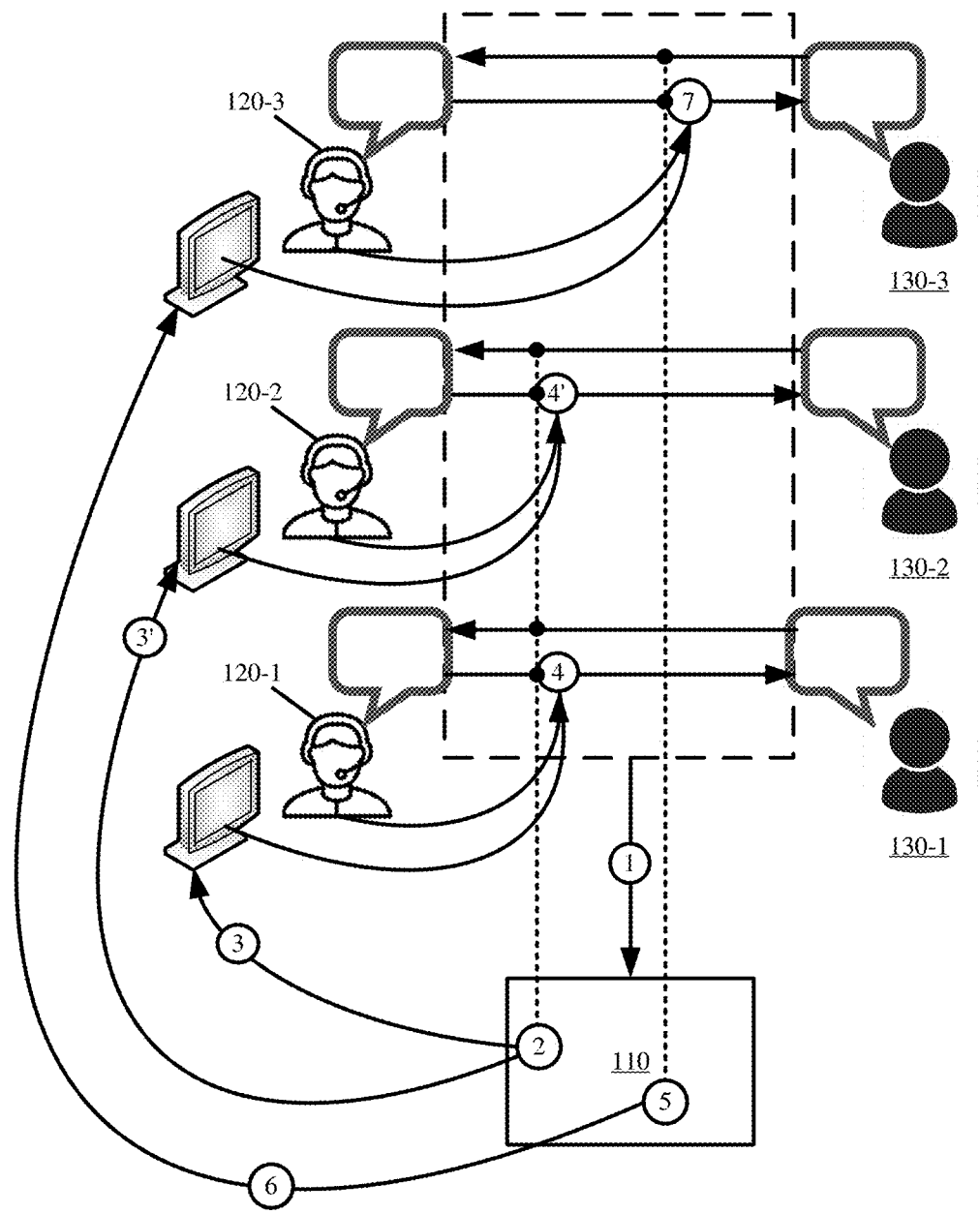
FIG. 1 illustrates an example of the adaptive conversational system performing parallel and real-time monitoring and controlling of different ongoing conversations with different telephone agents in accordance with some embodiments described herein.

FIG. 1 illustrates an example of adaptive conversational system 110 performing parallel and real-time monitoring and controlling of different ongoing conversations with different telephone agents in accordance with some embodiments described herein. As shown in FIG. 1, adaptive conversational system 110 may simultaneously monitor (at 1) three active and ongoing calls between telephone agents 120-1, 120-2, and 120-3 (herein sometimes collectively referred to as "telephone agents 120" or individually as "telephone agents 120") and participants 130-1, 130-2, and 130-3 (herein sometimes collectively referred to as "participants 130" or individually as "participant 130"). The call monitoring (at 1) may include providing adaptive conversational system 110 with real-time and parallel access to each call. For instance, the audio stream of each call may be connected to, received by, and/or analyzed by adaptive conversational system 110 as each call is happening.

Based on the call access and call monitoring (at 1), adaptive conversational system 110 may detect various conversation elements at the current point of each call. The conversation elements may include spoken words or dialog, the tone of each speaker, the sentiment, call behavior and etiquette (e.g., number of interruptions, speaking time of each participant, number of pleasantries, etc.), workflow progression, call disposition (e.g., positive or negative, successful or unsuccessful, etc.), timing, and/or other descriptive information about each call or speaker. In some embodiments, adaptive conversational system 110 may access one or more databases to obtain telephony information associated with each call. The telephony information may provide additional information about each participant 130 (e.g., location, name, age, position, employer, demographics, etc.), historical context about earlier calls with each participant 130 (e.g., prior call dispositions, status, and/or dynamic controls implemented by adaptive conversational system 110), other logged information and activity based on prior interactions with each participant 130, and/or other information that can be obtained on each participant 130 from other sources.

From the detected conversation elements and/or obtained telephony information, adaptive conversational system 110 may determine different rules that apply to the calls at different times. A rule may apply to a particular point in a call when one or more of the conversation elements, that are detected at the particular point or earlier points in the call, and/or obtained telephony information match to triggering elements of a rule. For instance, adaptive conversational system 110 may detect (at 2) that a first call, that is between telephone agent 120-1 and participant 130-1, and a second call, that is between telephone agent 120-2 and participant 130-2, trigger the same first rule as a result of the same phrase being spoken at the same time in each call, the same amount of time passing from when each call was initiated, or the same compliance requirement being enforced at the same time in each call.

As shown in FIG. 1 and in response to the first rule being simultaneously triggered (at 2) by the first call and the second call, adaptive conversational system 110 may implement (at 3 and 3') or effectuate one or more actions defined for the first rule in order to control the first and second calls for compliance, best practices, informational, workflow, and/or other purposes. The actions may control or modify call behavior or activity of telephone agents 120-1 and 120-2. For instance, adaptive conversational system 110 may implement (at 3 and 3') or effectuate the one or more actions by providing an alert, message, instruction, information, data, or other notification to change a display or operation of call control devices used by first telephone agent 120-1 and second telephone agent 120-2. Changing the call control devices of first telephone agent 120-1 and second telephone agent 120-2 may produce (at 4 and 4') a corresponding change to the call. For instance, telephone agents 120-1 and 120-2 may provide a notice to satisfy a compliance requirement, may alter the direction of the conversation, may provide new information, and/or change behavior in other ways according to the one or more actions defined for the first rule.

Similarly, adaptive conversational system 110 may detect (at 5) that a third call, that is between telephone agent 120-3 and participant 130-3, triggers a different second rule at a later time. In response to the second rule being triggered (at 5), adaptive conversational system 110 may implement (at 6) or effectuate one or more actions defined for the second rule to dynamically alter the third call while the third call is ongoing. For instance, adaptive conversational system 110 may provide a change to the call control device of third telephone agent 120-3, and third telephone agent 120-3 may act (at 7) in the controlled manner specified by adaptive conversational system 110 and conveyed to third telephone agent 120-3 via the change that is made to the call control device of third telephone agent 120-3.

Figure 2:
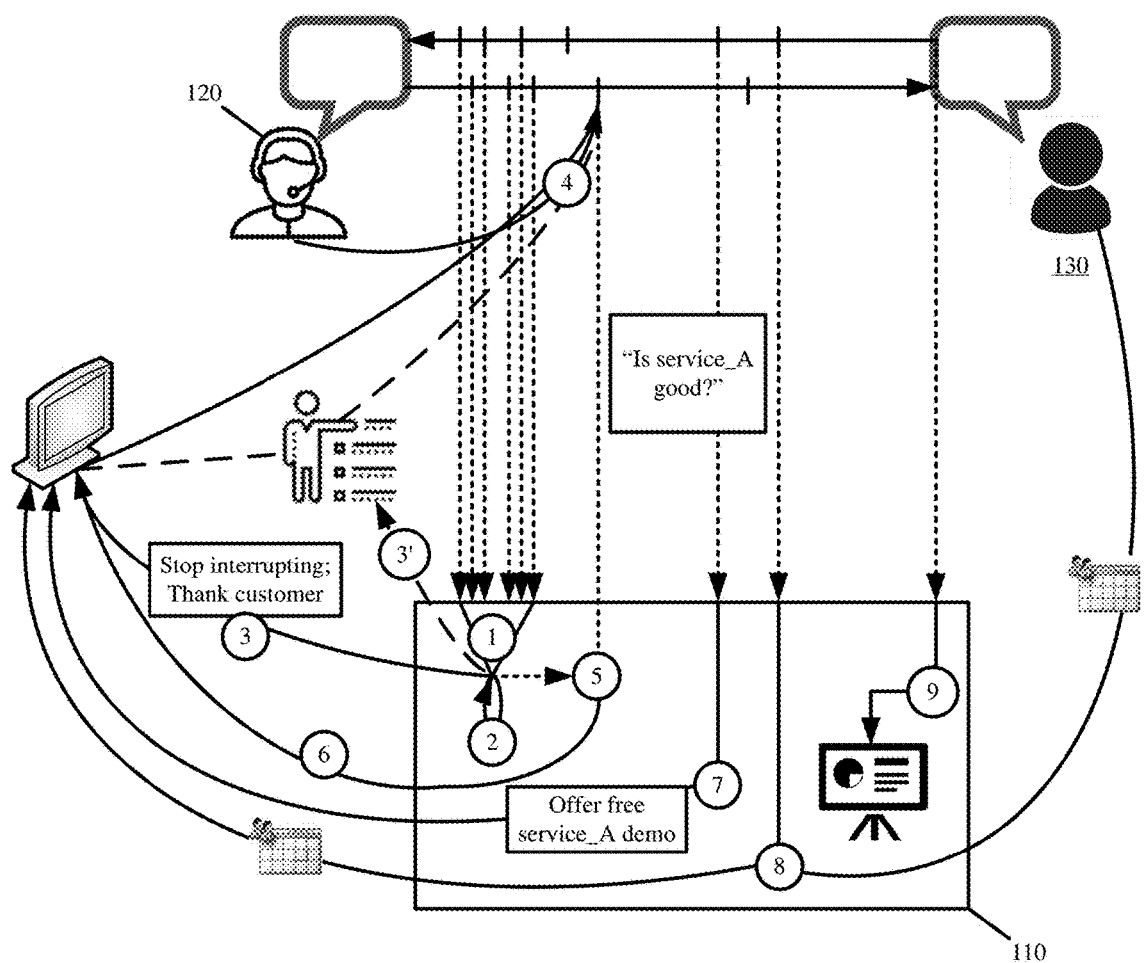
FIG. 2 illustrates an example of the adaptive conversational system controlling a conversation based on real-time rule matching and rule effectuation in accordance with some embodiments described herein.

FIG. 2 illustrates an example of adaptive conversational system 110 controlling a conversation based on real-time rule matching and rule effectuation in accordance with some embodiments described herein. As shown in FIG. 2, adaptive conversational system 110 may monitor (at 1) a first part of the conversation between telephone agent 120 and participant 130. Adaptive conversational system 110 may extract conversation elements from monitoring (at 1) the first part of the conversation, wherein the conversation elements may be extracted in real-time as the dialog between telephone agent 120 and participant 130 unfolds. As noted above, adaptive conversational system 100 may also obtain telephony information about participant 130 from other sources, and/or telephony information based on prior interactions with participant 130.

In this figure, adaptive conversational system 110 may detect (at 2) that the monitored conversation elements from the first part of the conversation violate a quality control rule. As a specific example, adaptive conversational system 110 may detect (at 2) that monitored conversation elements related to the call behavior of the telephone agent 120 violate the quality control rule. The monitored conversation elements may identify telephone agent 120 interrupting participant 130 some number of times that exceeds a threshold, telephone agent 120 failing to introduce himself or the company, telephone agent 120 using unapproved and unacceptable language or wording, and/or other behavior that violates the quality control rule.

Adaptive conversational system 110 may control the conversation at a first time, that corresponds to an end of the first part of the conversation, in response to detecting (at 2) the improper call behavior that violates the quality control rule. Adaptive conversational system 110 may control the conversation by providing (at 3) telephone agent 120 with instructions or commands to flag the improper call behavior. Adaptive conversational system 110 may further provide (at 3) telephone agent 120 with instructions or commands to correct the improper call behavior. In some embodiments, adaptive conversational system 110 may be connected to a call control device that is used by telephone agent 120 to initiate calls and obtain information to use during the calls. In some such embodiments, adaptive conversational system 110 may provide the instructions or commands to the call control device of the telephone agent 120. The call control device may display the instructions or commands to telephone agent 120 while telephone agent 120 is on an active call. In some embodiments, the call control device may provide the instructions or commands as audible prompts that only telephone agent 120 can hear.

If the improper call behavior involved frequent interruptions by telephone agent 120, the instructions or commands provided (at 3) by adaptive conversational system 110 may notify telephone agent 120 to allow participant 130 to finish speaking before telephone agent 120 begins speaking. Similarly, if the improper call behavior involved improper language or telephone agent 120 failing to give participant a proper greeting, the instructions or commands may provide specific lines for telephone agent 120 to recite. Alternatively, adaptive conversational system 110 may highlight certain words that telephone agent 120 should use based on best practices that adaptive conversational system 110 develops over time via machine learning. In some embodiments, adaptive conversational system 110 may control the discussion by dynamically providing telephone agent 120 with a script to follow in response to telephone agent 120 violating the quality control rule when operating without a script.

In some embodiments, adaptive conversational system 110 may selectively (at 3') notify a supervisor or another party of violations occurring during the call between telephone agent 120 and participant 130 when the number or severity of the violations trigger a condition of the applied rule or when the violations are not promptly corrected by telephone agent 120. The supervisor may choose to listen in on the call, join the call, privately communicate with telephone agent 120 via the call control device of telephone agent 120. For instance, adaptive conversational system 110 may notify a supervisor that telephone agent 120 has violated a quality control rule. Adaptive conversational system 110 may provide the supervisor with a transcript of the conversation or highlight the improper call behavior for the supervisor. Adaptive conversational system 110 may then establish a connection between call control devices of the supervisor and telephone agent 120 so that the supervisor can coach or provide instruction to guide telephone agent 120 for the remainder of the conversation. Adaptive conversational system 110 may also provide a link to the supervisor that allows the supervisor to participate directly in the ongoing conversation between telephone agent 120 and participant 130. If the supervisor invokes the link, adaptive conversational system 110 may connect a call control device of the supervisor to the ongoing conversation.

Telephone agent 120 may change (at 4) the conversation in response to the instructions or commands provided (at 3) by adaptive conversational system 110. Telephone agent 120 may change (at 4) the conversation by modifying his/her behavior to adhere to the instructions or commands, by reciting certain language or wording provided (at 3) by adaptive conversational system, and/or by performing other actions or operations provided (at 3) by adaptive conversational system.

Adaptive conversational system 110 may continue monitoring the conversation to detect (at 5) that telephone agent 120 has corrected the improper call behavior at a second time and is no longer violating the quality control rule. Accordingly, adaptive conversational system 110 may remove (at 6) the instructions or commands from the call control device of telephone agent 120, may present other instructions, and/or may log the actions. In some embodiments, adaptive conversational system 110 may provide (at 6) a different script for telephone agent 120 to follow in response to detecting (at 5) that the improper call behavior has been corrected.

Adaptive conversational system 110 may also trigger workflow rules and/or dynamically control the conversation in response to dialog or actions of participant 130. For instance, adaptive conversational system 110 may detect (at 7), at a third later time, one or more conversation elements spoken by participant 130 that trigger a different workflow rule. Adaptive conversational system 110 may obtain the workflow rule based on real-time matching of conversation elements extracted from a current point in the conversation (e.g., at the third time) to the workflow rule definition, and may execute one or more actions specified as part of the workflow rule to control the conversation. For instance, participant 130 may recite that he is not interested in a service, or may recite that he is interested in learning more about the service. The workflow rule may specify one or more actions to advance the call to a positive disposition based on these conversation elements and best practices developed by adaptive conversational system 110 via machine learning. The actions may include offering a free demonstration of the service to participant 130. Accordingly, adaptive conversational system 110 may control the conversation at the third time by providing (at 7) a notification to telephone agent 120, via the call control device of telephone agent 120, to offer the demonstration to participant 130 before terminating the conversation.

In response to the provided (at 7) notification, telephone agent 120 may change the conversation in order to offer the demonstration. Adaptive conversational system 110 may monitor the remainder of the conversation to detect whether participant 130 accepts or declines the demonstration.

In response to extracting a conversation element that indicates participant 130 accepting the demonstration, adaptive conversational system 110 may automatically generate an electronic meeting invitation on behalf of telephone agent 120, and may electronically provide (at 8) the meeting invitation to telephone agent 120 and participant 130. In some embodiments, adaptive conversational system 110 may have access to calendars of either or both telephone agent 120 and participant 130, and may scan calendars of telephone agent 120 and/or participant 130 to schedule an available time for the meeting. Adaptive conversational system 110 may obtain the email addresses of telephone agent 120 and participant 130 from telephony data that is obtained or available when telephone agent 120 initiates the call to participant 130. The telephony data may be retrieved from one or more databases used in conjunction with adaptive conversational system 110. Alternatively, the telephony data may be obtained as a conversation element that adaptive conversational system 110 extracts from the conversation. For instance, telephone agent 120 may ask for participant's 130 email address, and adaptive conversational system 110 may detect the email address when spoken by participant 130 or when provided via an instant message, email, text message, or other electronic form to the call control device of telephone agent 120.

Adaptive conversational system 110 may also create (at 9) or perform various follow-up tasks based on conversation elements detected later in the conversation or throughout the entirety of the conversation, based on the disposition of the conversation, and/or actions of one or more rules effectuated during the conversation. For instance, at the end of the call and/or as part of scheduling the demonstration, adaptive conversational system 110 may instruct (at 9) other personnel to prepare a customized demonstration for participant 130 prior to the time of the scheduled demonstration. Alternatively, adaptive conversational system 110 may invoke a script to automatically generate the customized demonstration, and to provide the customized demonstration to telephone agent 120.

Adaptive conversational system 110 may use quality control rules and workflow rules, such as the example rules illustrated in FIG. 2 above, to implement best practices. The best practices may include actions or behavior of telephone agents 120 that have resulted in repeat positive dispositions for a company. The positive dispositions may include completed sales, satisfied customers (e.g., receiving positive reviews or feedback), efficient, effective, and successful troubleshooting, providing participant 130 with correct information, treating customers professionally and efficiently, and/or meeting any other objective.

Controlling conversations using the quality control rules and workflow rules may adapt the actions or behavior of less experienced telephone agents 120 to mirror the actions or behavior of the most successful or experienced telephone agents 120 (e.g., telephone agents with the highest number or percentage of positive dispositions). This reduces time and cost for a company because adaptive conversational system 110 may selectively control the conversations of less effective or less experienced telephone agents 120 in order to guide them in real-time to implement the best practices of more effective or more experienced telephone agents 120 without extensive pretraining or retraining after one or more calls are completed with negative dispositions. In other words, adaptive conversational system 110 may swing the disposition of a call in real-time by changing the conversation in response to invoking a rule and/or controlling the conversation based on the invoked rule when one or more extracted conversation elements indicate a possible negative disposition.

Adaptive conversational system 110 may also enhance the effectiveness of telephone agents 120 and improve the chances that each call reaches a positive disposition by dynamically providing telephone agents 120 with information that is requested or that supplements the ongoing conversation with a participant 130. In some embodiments, adaptive conversational system 110 may include data rules that may be triggered based on questions, requests, keywords, sentiment, call behavior and etiquette, workflow progression, call disposition, timing, and/or other information. Execution of a data rule may cause adaptive conversational system 110 to control a conversation by providing telephone agent 120 with a specific set of data that is relevant to the current point in the conversation.

Figure 3:
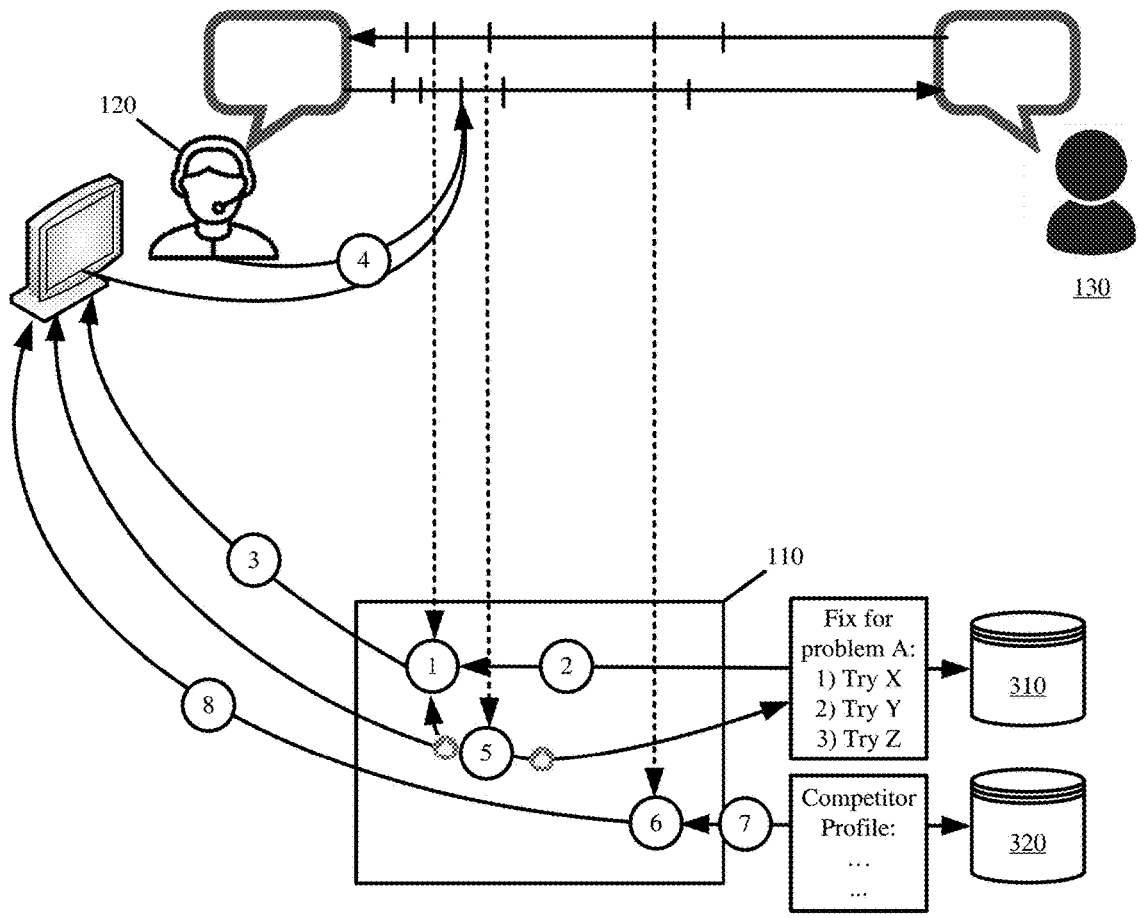
FIG. 3 illustrates an example of the adaptive conversational system controlling a conversation based on real-time matching and effectuation of one or more data rules in accordance with some embodiments described herein.

FIG. 3 illustrates an example of adaptive conversational system 110 controlling a conversation based on real-time matching and effectuation of one or more data rules in accordance with some embodiments described herein. As shown in FIG. 3, adaptive conversational system 110 monitors a conversation between telephone agent 120 and participant 130, and detects (at 1) one or more conversation elements, at a first time in the conversation, that match a first data rule configured for adaptive conversational system 110. For instance, the one or more conversation elements may include participant 130 mentioning a company product with angry sentiment. The one or more conversation elements may mention that the company product has an issue, thereby corroborating the angry sentiment.

The first data rule may include one or more actions for adaptive conversational system 110 to query (at 2) first database 310 for a first set of supplemental data using the one or more conversation elements that trigger the first data rule. First database 310 may return (at 2) the first set of supplemental data that pertains to the company product and/or the expressed angry sentiment.

The first set of supplemental data may include troubleshooting instructions for telephone agent 120 to follow based on the exact issue that participant 130 expressed in the one or more conversation elements triggering the first data rule. The first set of supplemental data may further include schematics for the product and/or a dynamic set of questions for diagnosing the issued experienced by participant's 130. In some embodiments, the dynamic set of questions may change based on each response provided by participant 130. In some embodiments, the first set of supplemental data may be provided with a dynamic script that is customized for the company product. The script may be generated based on the detected angry sentiment. The script may guide telephone agent 120 in discussing the company product in an approved or best practices manner.

Adaptive conversational system 110 may present (at 3) the first set of supplemental data on the call control device of telephone agent 120. In doing so, adaptive conversational system 110 may control the ongoing conversation by changing (at 4) the conversation towards resolving the issue.

Adaptive conversational system 110 may continue to monitor the conversation in order to determine if telephone agent 120 is able to progress through the workflow and resolve the issue with a positive disposition. For instance, adaptive conversational system 110 may detect (at 5) conversation elements indicating the positive disposition, and in response, may record or log that the first set of supplemental data and/or specific actions taken by telephone agent 120 were successful in overcoming the issue. As a result of the positive disposition and identifying the first data rule as being effective, adaptive conversational system 110 may use the same first set of supplemental data to resolve the same or similar issues experienced by other participants, or may route calls from other participants with the same or similar issues to telephone agent 120 with experience successfully resolving those issues.

If adaptive conversational system 110 detects conversation elements indicating a negative disposition (e.g., the issue was not resolved in a satisfactory manner), adaptive conversational system 110 may record or log that the first set of supplemental data and/or actions taken by telephone agent 120 did not resolve the issue and that the first data rule was ineffective. In this case, subsequent callers with the same or similar issue may trigger a different data rule, that presents the telephone agents 120 receiving those callers, with different supplemental data.

Continuing with FIG. 3 at a later second point in the conversation, adaptive conversational system 110 may detect (at 6) one or more conversation elements that trigger a different second data rule. The second data rule may be triggered in response to participant 130 mentioning a keyword that is linked to a competitor (e.g., name of the competitor, name of a competitor product or service, employee of a competitor, etc.).

The actions of the second data rule may cause adaptive conversational system 110 to query (at 7) a different second database 320 in order to obtain (at 7) a second set of supplemental data about the competitor. Adaptive conversational system 110 may provide (at 8) the second set of supplemental data to telephone agent 120 to guide telephone agent's 120 response to the competitor that was mentioned.

It should be noted that adaptive conversational system 110 may provide (at 8) the second set of supplemental data to telephone agent 120 immediately after participant 130 mentions the competitor such that the second set of supplemental data is relevant for the current point in the conversation. In other words, the first set of supplemental data provided (at 3) by adaptive conversational system 110 to telephone agent 120 at the first time was directly relevant to a corresponding first point in the conversation, with the first time being a few milliseconds or seconds removed from the first point in the conversation. Similarly, the second set of supplemental data provided (at 8) at the second time was relevant to a corresponding second point in the conversation, with the second time being a few milliseconds or seconds removed from the second point in the conversation.

The second set of supplemental data may identify competing services of the competitor, various advantages of the company's services over the competitor's services, and/or other information telephone agent 120 may use to encourage participant 130 to use the company's services instead of the competitor's services. Moreover, the second set of supplemental data may include a dynamic script that is customized based on the identified competitor, and that guides telephone agent 120 in discussing the identified competitor with participant 130. Accordingly, database 320 may include an internal and/or external data source from which adaptive conversational system 110 may obtain third-party integrated data about the competitor and/or proprietary data that the company generated on the competitor. In some embodiments, the third-party integrated data may be combined with the proprietary data in order to generate the dynamic script.

In some embodiments, the second set of supplemental data may include a coupon or discount that telephone agent 120 may offer to participant 130 should the conversation escalate to a point where participant 130 is going to move to the competitor's services. In some such embodiments, the data rule may have multiple conditions. The first condition may be triggered upon mention of the competitor, and may provide telephone agent 120 with information about the competitor. The second condition may be triggered based on conversation elements spoken by participant 130 that indicate participant's preference of the competitor over the company represented by telephone agent 120, and may provide telephone agent 120 with authority to present the coupon or discount to participant 130.

In some embodiments, data rules can be defined to directly answer questions. For instance, participant 130 may ask how much a particular service costs, and adaptive conversational system 110 may surface the answer on the call control device of telephone agent 120 when participant 130 finishes asking the question or within a few seconds thereafter.

In any case, adaptive conversational system 110 may control the conversation by equipping telephone agent 120 with information that can change the conversation and lead to a positive disposition, or at least address that particular point of the conversation with information in support of best practices and an effective telephone agent 120. For instance, equipped with the dynamically changing supplemental data, telephone agent 120 may be able to engage in the conversation and perform actions that would otherwise not be possible or would have been less effective if telephone agent 120 did not have the supplemental data provided by adaptive conversational system 110 at the exact time in the conversation when the supplemental data was needed.

In some embodiments, adaptative conversational system 110 is used for compliance purposes. The actions and behavior of telephone agents 120 may be regulated by company policies or by legislation. Noncompliance can lead to negative call disposition as well as criminal and/or civil penalties. Accordingly, adaptive conversational system 110 may include a set of compliance rules that can be enforced against every second of every call made by a telephone agent 120 to detect, correct, and log any noncompliance.

Figure 4:
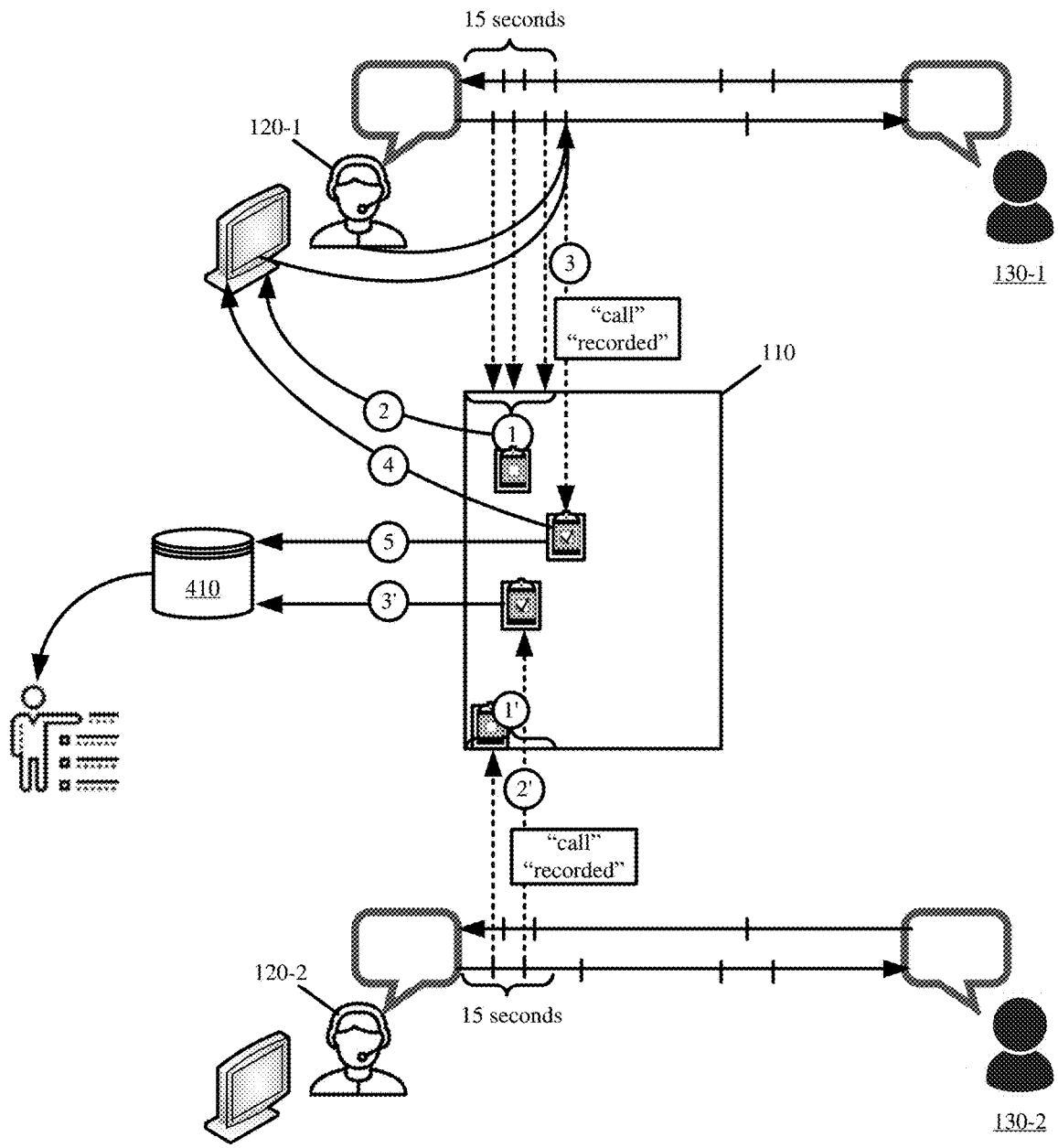
FIG. 4 illustrates an example of the adaptive conversational system controlling call compliance based on real-time matching and effectuation of one or more compliance rules in accordance with some embodiments described herein.

FIG. 4 illustrates an example of adaptive conversational system 110 controlling call compliance based on real-time matching and effectuation of one or more compliance rules in accordance with some embodiments described herein. As shown in FIG. 4, adaptive conversational system 110 monitors (at 1) a first part of a first conversation between telephone agent 120-1 and participant 130-1, while simultaneously monitoring (at 1') a first part of a second conversation between telephone agent 120-2 and participant 130-2. The first part of each conversation may include a specified amount of time (e.g., 15 seconds) from when the conversation or call was initiated.

In this particular example, adaptive conversational system 110 may be configured with a compliance rule that determines whether a particular set of words or phrase is spoken during the first part of each conversation. Accordingly, the compliance rule may be defined with a trigger that includes the particular set of words or phrase, and a time condition for when the particular set of words or phrase must be recited for compliance. For instance, adaptive conversational system 110 may monitor (at 1 and 1') the first 15 seconds of each conversation to detect if telephone agent 120 notifies participant 130 that the call is being recorded as may be legally required when recording calls. Other examples of compliance rules may include identifying the call as a sales call, identifying the actual name of the company and/or telephone agent 120, identifying the call as a campaign or election related call, identifying that information gathered during the call will be shared with other parties, and identifying that participant 130 is explicitly opting-into a service or product.

From monitoring (at 1) the first part of the first conversation, adaptive conversational system 110 may determine that the conversation elements extracted from the first part of the first conversation do not satisfy the compliance rule. In response to determining that the first conversation violates the compliance rule after the first part of the first conversation (e.g., first 15 seconds of the conversation), adaptive conversational system 110 may control the first conversation by directing (at 2) telephone agent 120-1 to provide a specific compliance notice.

As shown in FIG. 4, adaptive conversational system 110 may provide (at 2) a real-time alert to the call control device of telephone agent 120-1 once the compliance notice is not provided within the initial 15 seconds of the conversation. In response to providing (at 2) the real-time alert, a message may appear on the call control device of telephone agent 120-1 at the 15 second mark to remind and/or instruct telephone agent 120-1 to provide the compliance notice to participant 130-1.

In some embodiments, the call control device of telephone agent 120-1 may display the compliance notice at the initiation of the call. If telephone agent 120-1 does not recite the compliance notice during the first 15 seconds of the call, adaptive conversational system 110 may control the conversation by interrupting the call in order to play the compliance notice at the 15 second mark. For instance, adaptive conversational system 110 may directly connect to the ongoing call and play a prompt at the 15 second mark that the call is being recorded.

Adaptive conversational system 110 may continue monitoring the first conversation, and may detect (at 3) that the compliance rule is satisfied after providing (at 2) the real-time alert. Specifically, adaptive conversational system 110 may extract conversation elements from the ongoing conversation between telephone agent 120-1 and participant 130-1 after the 15 second mark, and may detect one or more conversation elements that include the particular set of words or phrase necessary for compliance (e.g., "recorded").

In response to detecting (at 3) that the first conversation is in compliance with the compliance rule, adaptive conversational system 110 may remove (at 4) the real-time alert from the call control device of telephone agent 120-1. Removal (at 4) of the real-time alert may notify telephone agent 120-1 that he is now in compliance. In some embodiments, adaptive conversational system 110 may provide (at 4) a message to the call control device of telephone agent 120-1 that the first conversation is now compliant.

Adaptive conversational system 110 may also log (at 5) a compliance record in database 410. The compliance record may include a timestamp corresponding to the time when the particular set of words or phrases for compliance were recited during the first conversation. The compliance record may also include the one or more conversation elements that resulted in compliance or an entire recording of the first conversation to verify compliance, wherein the one or more conversation elements may correspond to the portion of the conversation where telephone agent 120-1 recites the particular set of words or phrases for compliance. The compliance record may be used to pinpoint the exact location at which each call became compliant for faster validation or verification if the company is audited.

As also shown in FIG. 4, adaptive conversational system 110 may monitor (at 1') the second conversation between telephone agent 120-2 and participant 130-2 in parallel with monitoring (at 1) the first conversation. Adaptive conversational system 110 may determine (at 2') that telephone agent 120-2 recites the particular set of words or phrases for compliance during the first part (e.g., first 15 seconds) of the second conversation by extracting one or more conversation elements within the first part of the second conversation, and by matching the extracted one or more conversation elements to the particular set of words or phrase specified as part of the compliance rule.

In response to the detected compliance of the second conversation within the first part of the call, adaptive conversational system 110 may allow the conversation to continue uninterrupted, and may log (at 3') a compliance record for the second conversation to database 410. Once against, the compliance record may include a snippet of the conversation where the particular set of words or phrase was spoken by telephone agent 120-2, and a corresponding timestamp for when the particular set of words or phrase was spoken during the second conversation.

In logging (at 3 and 3') compliance information, adaptive conversational system 110 may identify the telephone agent 120 on each conversation that was or was not compliant so that a supervisor can track telephone agent 120 performance. For instance, the supervisor may access the compliance records from database 410 to determine any calls that were noncompliant, determine if the noncompliant calls were rectified, identify any telephone agents 120 for the noncompliance, and/or verify that compliant calls were correctly identified by adaptive conversational system 110. More importantly, the supervisor may verify compliance and/or obtain a report based on the compliance records without having to listen in on each and every call made by telephone agents 120. In this manner, adaptive conversational system 110 greatly simplifies the compliance task, thereby allowing a company to have fewer supervisors or compliance officers. Alternatively, the supervisors or compliance officers can spend more time performing other tasks besides the mundane the task of listening in on the first 15 seconds of every call.

Adaptive conversational system 110 may support the quality control, workflow, data, compliance, and/or other rules. Each rule may be defined with a particular structure that allows for rapid matching and for rapid execution that is necessary for the real-time effectuation of the rules and timely control of the conversations by adaptive conversational system 110. In some embodiments, the rule structure may be defined so that adaptive conversational system 110 may retain all rules in memory in order to perform the real-time matching of extracted conversation elements to the rules.

Figure 5:
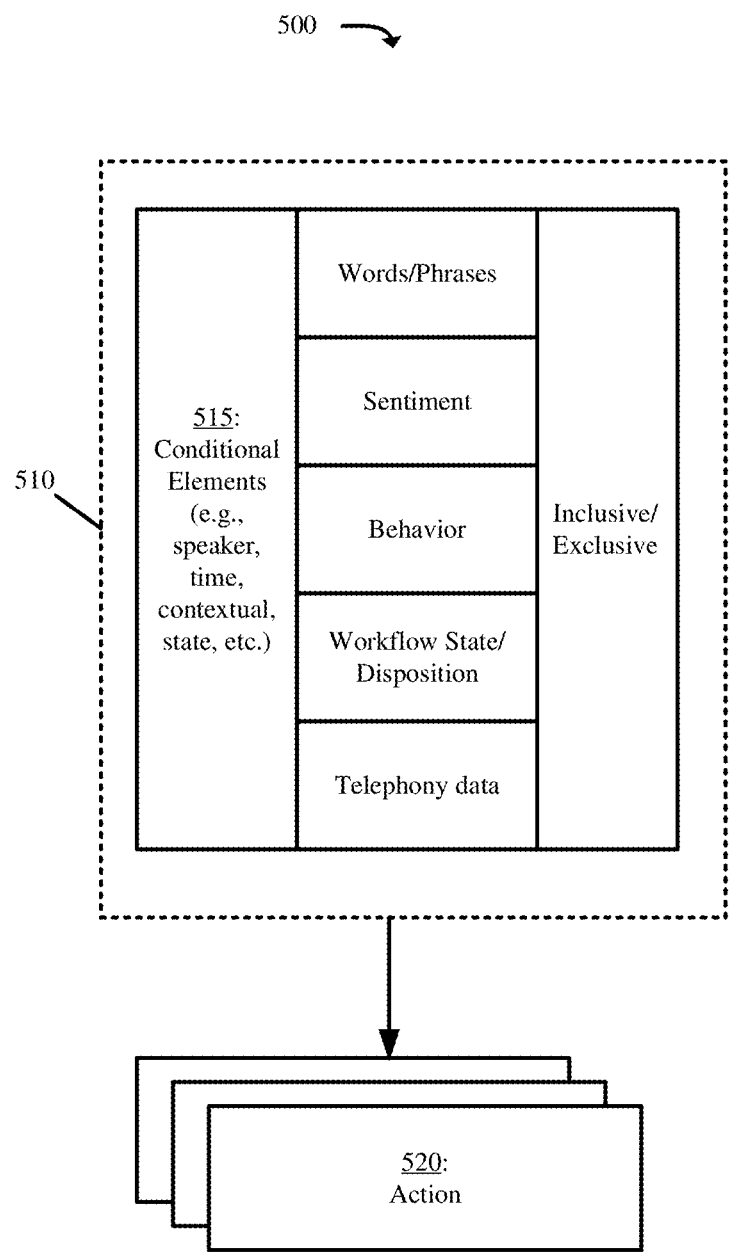
FIG. 5 conceptually illustrates an example structure for different rules used by the adaptive conversational system to control different conversations in accordance with some embodiments.

FIG. 5 conceptually illustrates an example structure for different rules 500 used by adaptive conversational system 110 to control different conversations in accordance with some embodiments. Each rule 500 may include one or more triggers 510 and one or more actions 520.

For a particular rule 500, trigger 510 may specify the one or more conversation elements that invoke the particular rule 500. The conversation elements used to define trigger 510 include some of the same conversation elements that adaptive conversational system 110 extracts in real-time from monitoring active calls or ongoing conversations. For instance, trigger 510 may include dictionary or proprietary words or phrases. Proprietary words or phrases may include unique names of company products, services, or other offerings as well as words or phrases used by competitors to identify their products, services, or other offerings.

Trigger 510 may also be defined according to the tone, sentiment, behavior, and/or etiquette of a speaker. These conversation elements may include metrics or counts that are derived from monitoring the conversation (e.g., number of interruptions, number of detect laughter, duration of laughter, number of questions, number of certain words being used, etc.), and may also include tokens or identifiers that correspond to the detected tone, sentiment, behavior, or etiquette.

Trigger 510 may also be defined according to workflow states (e.g., call started, demonstration initiated, demonstration completed, pricing offered, sale declined, sale complete, etc.) as well as call disposition (e.g., positive or negative, successful or unsuccessful, etc.). The workflow states and call disposition may include preconfigured values or user-defined values.

Trigger 510 may also be defined to include telephony data and other connected database information that can be obtained before or upon initiating a call. The telephony data may provide information about the participant (e.g., contact information, age, income, interests, location, etc.), purposes of the call (e.g., new customer, follow-up call, service call, etc.), and/or other information obtained independent of the actual call dialog.

Trigger 510 may be formed from any combination of the elements above (e.g., conversation elements, tone, sentiment, behavior, and/or etiquette, workflow states, and telephony data) or other elements obtained from the conversation or external sources. Each trigger 510 or each conversation element of each trigger 510 may also be qualified with one or more conditional elements 515.

A conditional element 515 for trigger 510 may define which parts of a conversation or conversation elements are matched against trigger 510, and/or can be used to invoke actions 520 that flow from trigger 510. In other words, conditional elements 515 may specify when conversation elements extracted from a conversation can be matched to rule 500.

In some embodiments, conditional elements 515 may be speaker-based. For example, conversation elements spoken by a first speaker may be matched against conversation elements used to defined trigger 510 and may be used to invoke trigger 510, whereas the exact same conversation elements spoken by a second speaker may be ignored and may not be used to invoke trigger 510. The speaker-based conditional elements 515 may be used to differentiate triggers 510 for telephone agents 120, participants 130, supervisors, and/or users that may engage in a call. The different speakers may be identified based on their voice (e.g., tone, pitch, and/or other sound characteristics), the device being used on the call, the direction of the audio, etc.

In some embodiments, conditional elements 515 may be time-based. For example, trigger 510 may be defined to apply to the first 15 seconds of a conversation. In this example, if conversation elements from the first 15 seconds of a conversation match to conversation elements defined for trigger 510 with the time condition, then corresponding actions 520 are invoked. Otherwise, if conversation elements after the first 15 seconds of a conversation match to conversation elements defined for trigger 510 with the time condition, then the rule is not invoked.

Conditional elements 515 may also be defined contextually or based on state. For instance, trigger 510 may be defined to apply when a conversation progresses to a first state in a workflow (e.g., pricing offered state), and may cease to apply after the conversation progresses past the first state to a different second state.

Conditional elements 515 may be chained off one another. For a chained conditional element 515, a conversation must satisfy a sequence of conditions before conversation elements from that conversation can be used to invoke a rule that is defined with a multi-step conditional element.

In some embodiments, different conditional elements 515 can be applied to individual or different subsets of conversation elements defining trigger 510. For instance, rule 500 may be specified with trigger 510 that contains conditional element 515 requiring that a first word be spoken within 10 seconds of a second work in order to invoke rule 500 or that a second word be spoken between the 20 and 25 mark of a conversation in order to invoke the same rule 500.

Adaptive conversational system 110 may continually compare conversation elements that are extracted from a conversation against rule 500 when trigger 510 is defined without any conditional elements 515. Conditional elements 515 can therefore be used to limit the application of rule 500. Conditional elements 515 can also be used to define a stateful rule that is invoked when a conversation has progressed through a specific set of states. For instance, a stateful rule may be invoked when a call has reached 2 minutes in duration, has progressed to a "demonstration completed" state, sentiment of the participant is positive, and the words "buy", "sale", "complete", or "ready" are recited after progressing to the "demonstration completed" state.

Each trigger 510 or each of the conversation elements defined for trigger 510 may be defined to be inclusive or exclusive. An inclusive trigger is invoked when one or more conversation elements extracted from a conversation match to the conversation elements defined for the inclusive trigger. Similarly, an inclusive conversation element must be matched to a conversation element from a call in order for the corresponding rule to be invoked. An exclusive trigger is invoked when one or more conversation elements extracted from a conversation do not match the conversation elements defined for the exclusive trigger. For instance, trigger 510 may be defined with exclusive conversation elements "call" and "recorded" within 5 seconds of each other such that if a conversation advances without these words being spoken within 5 seconds of each other, corresponding actions 520 defined for trigger 510 are invoked.

In response to invoking rule 500 or satisfying trigger 510 of rule 500, adaptive conversational system 110 may execute actions 520 defined for rule 500. Actions 520 define the manner in which adaptive conversational system 110 controls a conversation after rule 500 is invoked.

Actions 520 may include instructions, commands, data, alerts, and/or operations to present to a telephone agent 120 that is engaged in a conversation triggering rule 500 defined with actions 520. Actions 520 may also include machine-executable operations. The machine-executable operations may include querying databases for information, connecting calls, connecting additional personnel to a call, interrupting a call, executing automated scripts with machine-executable instructions, providing discounts or offers, logging activities, calendaring meetings, sending messaging to call control devices used by telephone agents 120, participants 130, managers, and/or other systems, and/or controlling the operation of the call control devices used by telephone agents 120 and/or other devices that are communicably couple to adaptive conversational system 110. For instance, rule 500 may include trigger 510 that is defined with conversation elements "speak to a supervisor", and action 520 to connect a supervisor to an ongoing conversation if participant 130 asks to "speak to a supervisor".

In some embodiments, the rules may be generated manually according to the structure illustrated in FIG. 5. In some embodiments, adaptive conversational system 110 may dynamically generate and modify the rules using machine learning and/or artificial intelligence.

Adaptive conversational system 110 may use machine learning and/or artificial intelligence to track the effectiveness of each telephone agent 120, conversation, and/or rule in order to determine best practices, rules that produce positive dispositions, and/or telephone agents 120 whose actions should be mirrored by other telephone agents 120. Adaptive conversational system 110 may then automatically generate or modify rules that control future conversations in a manner that implements the best practices, improves the disposition of each call, and increases effectiveness of each telephone agent 120, conversation, and/or rule as determined from the machine learning and/or artificial intelligence.

Figure 6:
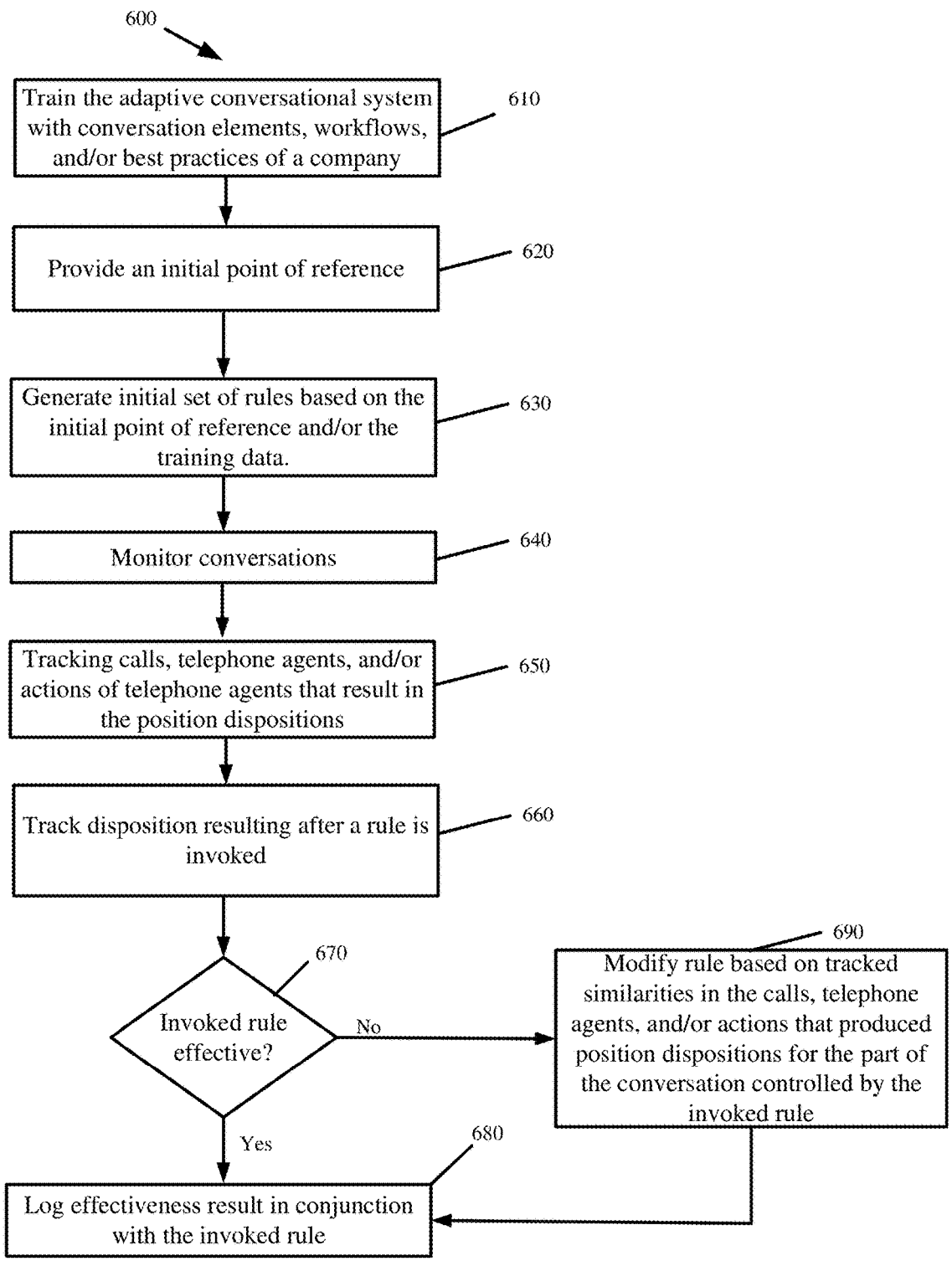
FIG. 6 presents a process by which adaptive conversational system 110 uses machine learning and/or artificial intelligence to dynamically adapt conversation controls for best practices, improved call disposition, and increased effectiveness in accordance with some embodiments described herein.

FIG. 6 presents a process 600 by which adaptive conversational system 110 uses machine learning and/or artificial intelligence to dynamically adapt conversation controls for best practices, improved call disposition, and increased effectiveness in accordance with some embodiments described herein. Process 600 may be performed by adaptive conversational system 110.

Process 600 may include training (at 610) adaptive conversational system 110. Training (at 610) may include configuring keywords for products, services, features, and desired actions. Additional training (at 610) may include specifying the workflows of the company, the positive dispositions and successful states of each workflow, and/or best practices of the company. In some embodiments, the training (at 610) may be optional.

Process 600 may include providing (at 620) adaptive conversational system 110 with an initial point of reference. The initial point of reference can be previously recorded calls of the company, anonymized calls of a competitor, rules defined or in use by a competitor, general rules for a company in the same industry or field, and/or rules derived from the training data.

Process 600 may include generating (at 630) the initial set of rules for controlling conversations upon initialization of adaptive conversational system 110 in a company based on the initial point of reference and/or the training data. Upon initialization, process 600 may include monitoring (at 640) conversations or calls made by different telephone agents 120 of the company. In monitoring (at 640) the conversations, adaptive conversational system 110 may extract conversation elements from the conversations, and may use the extracted conversation elements to match against the initial set of rules to determine different rules to invoke at different parts of the conversations.

Process 600 may include tracking (at 650) calls, telephone agents 120, and/or actions of telephone agents 120 that result in positive dispositions. Process 600 may also include tracking (at 660) the disposition resulting after a particular rule is invoked.

Process 600 may include determining (at 670) the effectiveness of a rule based on the dispositions tracked from different invocations of that rule. In some embodiments, the effectiveness of a rule may be based on multiple invocations of that rule and determining whether the multiple invocations produced a threshold number of positive dispositions.

In response to determining (at 670—Yes) that the rule is effective, process 600 may include logging (at 680) the effectiveness result in conjunction with the rule in order to obtain a metric that can be used to compare the effectiveness of different rules. In response to determining (at 670—No) that the rule is ineffective (e.g., the percentage of invocations resulting in a negative disposition being greater than a threshold percentage), process 600 may include modifying (at 690) the rule based on tracked (at 660) similarities in the calls, telephone agents 120, and/or actions that produced positive dispositions for the part of the conversation controlled by the ineffective rule. Process 600 may further include logging (at 680) the effectiveness result for the rule.

Figure 7:
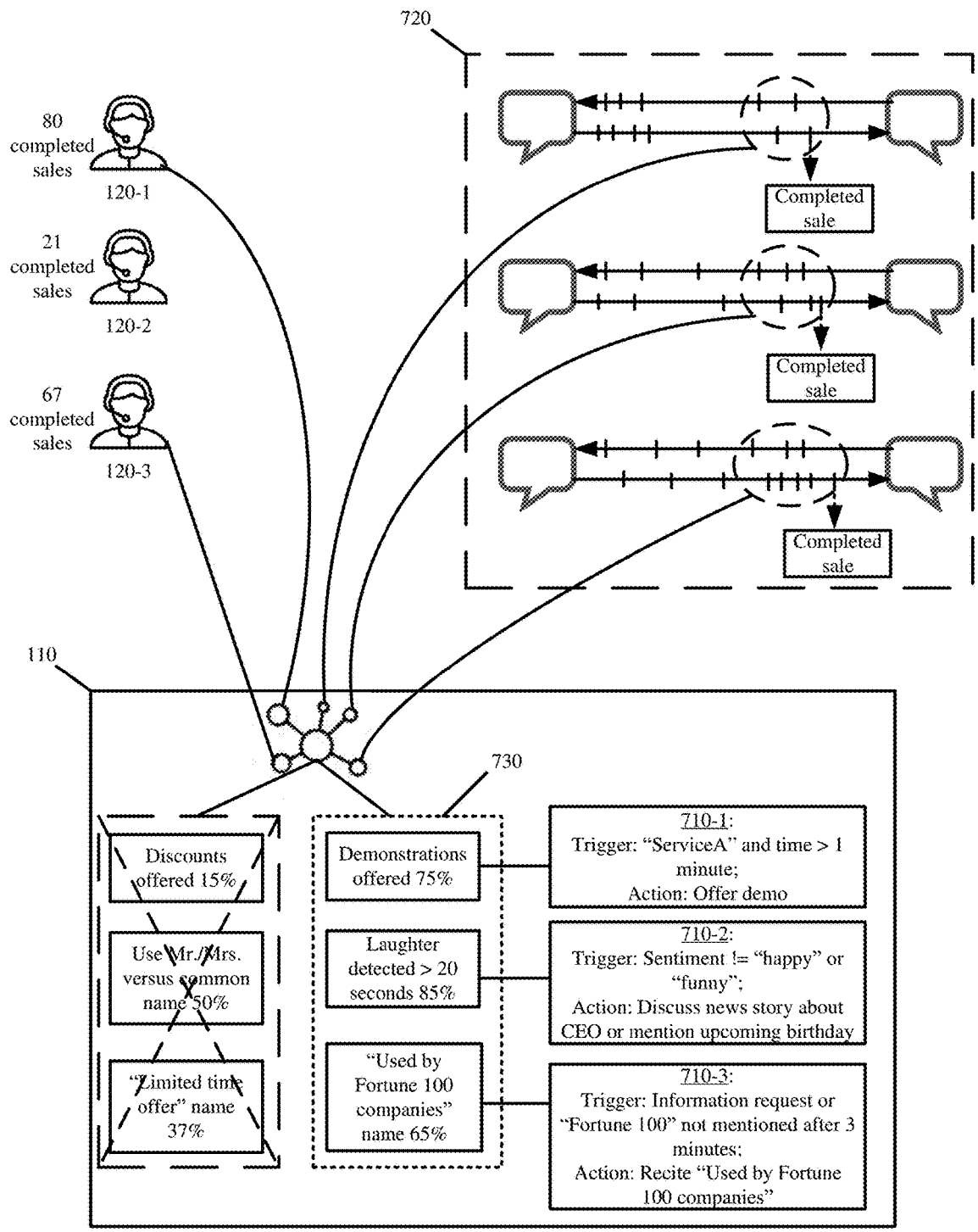
FIG. 7 illustrates an example of the adaptive conversational system generating new rules using machine learning and/or artificial intelligence in accordance with some embodiments.

FIG. 7 illustrates an example of adaptive conversational system 110 generating new rules using machine learning and/or artificial intelligence in accordance with some embodiments. Adaptive conversational system 110 may generate the new rules in order to replace other ineffective rules or in order to control the conversations for improved dispositions. As shown in FIG. 7, adaptive conversational system 110 may generate new rules 710-1, 710-2, and 710-3 (herein sometimes collectively referred to as "rules 710" or individually as "rule 710") for more effective sales. Each rule 710 is defined for the same objective of generating or completing a sale.

To generate each rule 710, adaptive conversational system 110 may identify a prior set of completed conversations 720 that were tagged with a positive disposition for a completed sale. Adaptive conversational system 110 may also identify telephone agents 120-1 and 120-3 with a high rate of completed sales.

Adaptive conversational system 110 may use machine learning and/or artificial intelligence to analyze the prior set of completed conversations 720 for common conversation elements, to analyze the actions that were taken by telephone agents 120-1 and 120-3 to complete sales, and to produce common conversation elements 730 that were part of some threshold number of completed sales or used in some threshold number of conversations that led to completed sales. Common conversation elements 730 may include common wording, phrasing, tone, sentiment, call behavior, etiquette, acts, presentations, demonstrations, pricing, discounts, timing, and/or other data that were commonly used by telephone agents 120-1 and 120-3, that were used for a large number of completed sales, or that were used in conversations that led to a high percentage of completed sales. Other identified conversation elements that were not effective or did not lead to a large number of completed sales or a high percentage of completed sales may be ignored or discarded.

Adaptive conversational system 110 may generate each rule 710 with at least one trigger and action, and the at least one trigger and action may be defined using the identified conversation elements that are similar between different completed sales. The trigger may be further defined with conditional elements to restrict when the rule is invoked. Rules 710 may be entered into the configuration or memory of adaptive conversational system 110. Thereafter, rules 710 may be implemented to control ongoing conversations of different telephone agents 120 leading to a sale so that the conversations follow the best practices for completing a sale.

In FIG. 7, adaptive conversational system 110 uses a prior set of completed sales conversations that were tagged with a positive disposition to generate a new set of rules that capture best practices from the prior set of completes sales conversation. The new set of rules can then be used to ensure that the same best practices are repeated during future sales conversations in order to increase the likelihood of a positive disposition for the future sales conversation.

Figure 8:
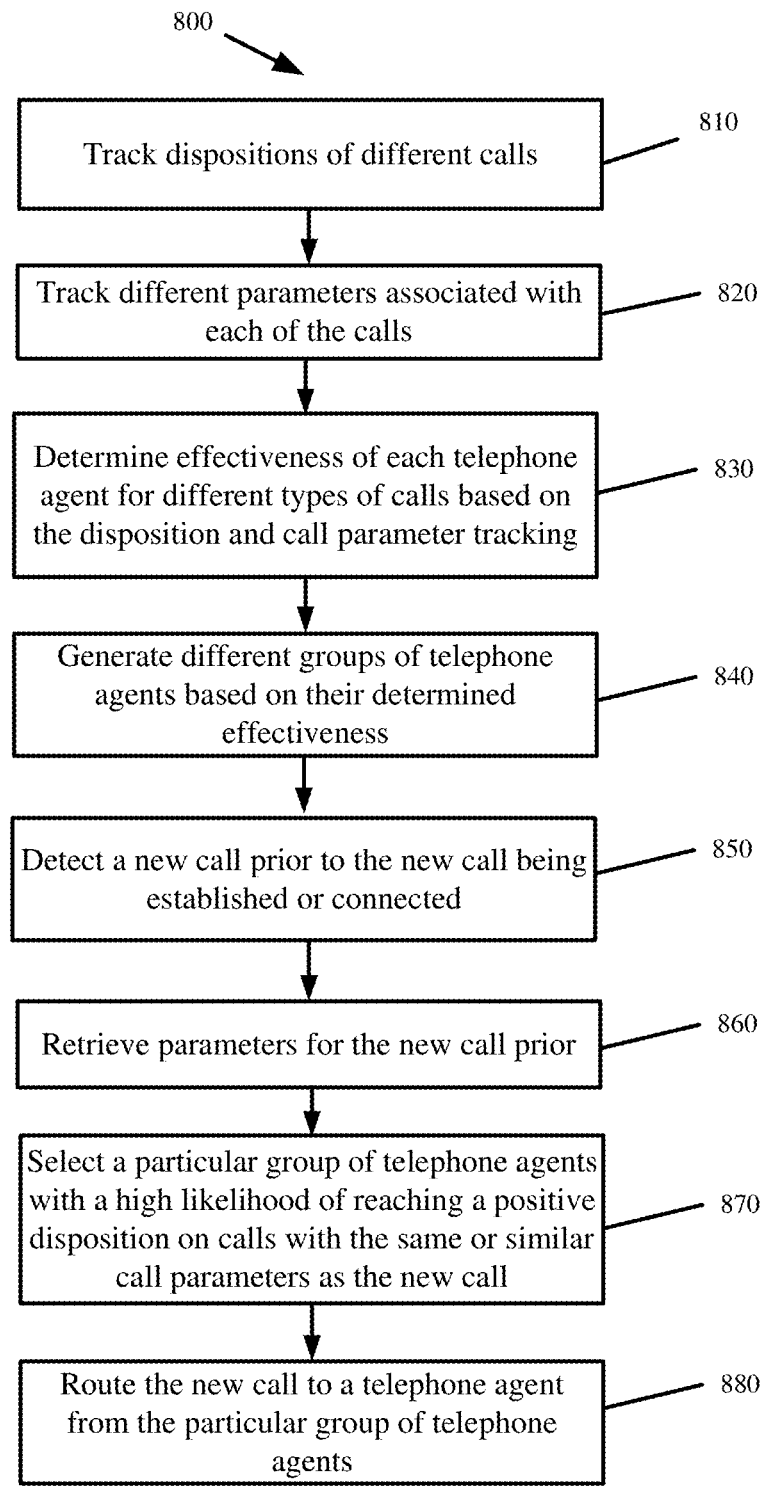
FIG. 8 presents a process by which the adaptive conversational system performs predictive call routing in accordance with some embodiments described herein.

Additionally, or alternatively, adaptive conversational system 110 may improve the likelihood of a conversation ending with a positive disposition, before the conversation is even started, by implementing predictive call routing. FIG. 8 presents a process 800 by which adaptive conversational system 110 performs predictive call routing in accordance with some embodiments described herein.

Process 800 may include tracking (at 810) the dispositions of different calls with different telephone agents 120, and also tracking (at 820) the different parameters associated with each of the calls. For instance, adaptive conversational system 110 may tag the record, that is created for each call, with different identifying information about the parties on the call (e.g., telephone agent 120 and participant 130), telephony data that may be obtained from internal or external databases prior to the call being established, and/or other data extracted from the call. The telephony data may include associating different inbound telephone numbers with different purposes (e.g., technical support, billing, sales, etc.), different products or services, or other parameters. Similarly, calls that resulted in follow-up conversations, sales, or other conclusions may be identified as calls with positive dispositions.

Process 800 may include determining (at 830) the effectiveness of each telephone agent 120 for different types of calls based on the disposition and call parameter tracking, and generating (at 840) different groups of telephone agents 120 based on their determined effectiveness. For instance, adaptive conversational system 110 may identify a first group of telephone agents 120 that reach a positive disposition on at least a threshold number of calls (e.g., greater than 75%) directed to sales of a first product, and may identify a different second group of telephone agents 120 that reach a positive disposition on at least the threshold number of calls directed to sales of a different second product.

Process 800 may include detecting (at 850), at adaptive conversational system 110, a new call prior to the new call being established or connected. The new call may be an inbound call that has to be answered by one of the telephone agents 120. The new call may also be an outbound call that needs to be placed by one of the telephone agents 120 to a call recipient.

Process 800 may include retrieving (at 860) parameters for the new call prior to the new call being established or connected. Adaptive conversational system 110 may retrieve the call parameters by querying one or more databases using caller-identification information for the entity that is calling or that will be called by a telephone agent 120 (e.g., the call participant). The queries may return information that identifies the call participant, previous interactions or history with the call participant, previous requests or inquiries made by the call participant, and/or other information that is discoverable prior to the call being established or connected from internal or external databases.

Process 800 may include selecting (at 870) a particular group of telephone agents 120 with a high likelihood of reaching a positive disposition on calls with the same or similar call parameters as the new call, and routing (at 880) the new call to a telephone agent 120 from the particular group of telephone agents 120 that is selected based on the call parameters. In this manner, adaptive conversational system 110 routes inbound and outbound calls to the telephone agents that are most effective in reaching a positive disposition based on past history with the call participant, the expected purpose of the call, where the call is coming from, and/or other parameters that can be identified prior to the call being established or connected.

In response to the new call being routed (at 880) to a particular telephone agent, the call may be established between the particular telephone agent and the participant. Adaptive conversational system 110 may then monitor the conversation between the particular telephone agent and the participant to ensure that the conversation follows best practices and to dynamically change the conversation if the conversation deviates from best practices, thereby triggering actions of different defined rules.

Figure 9:
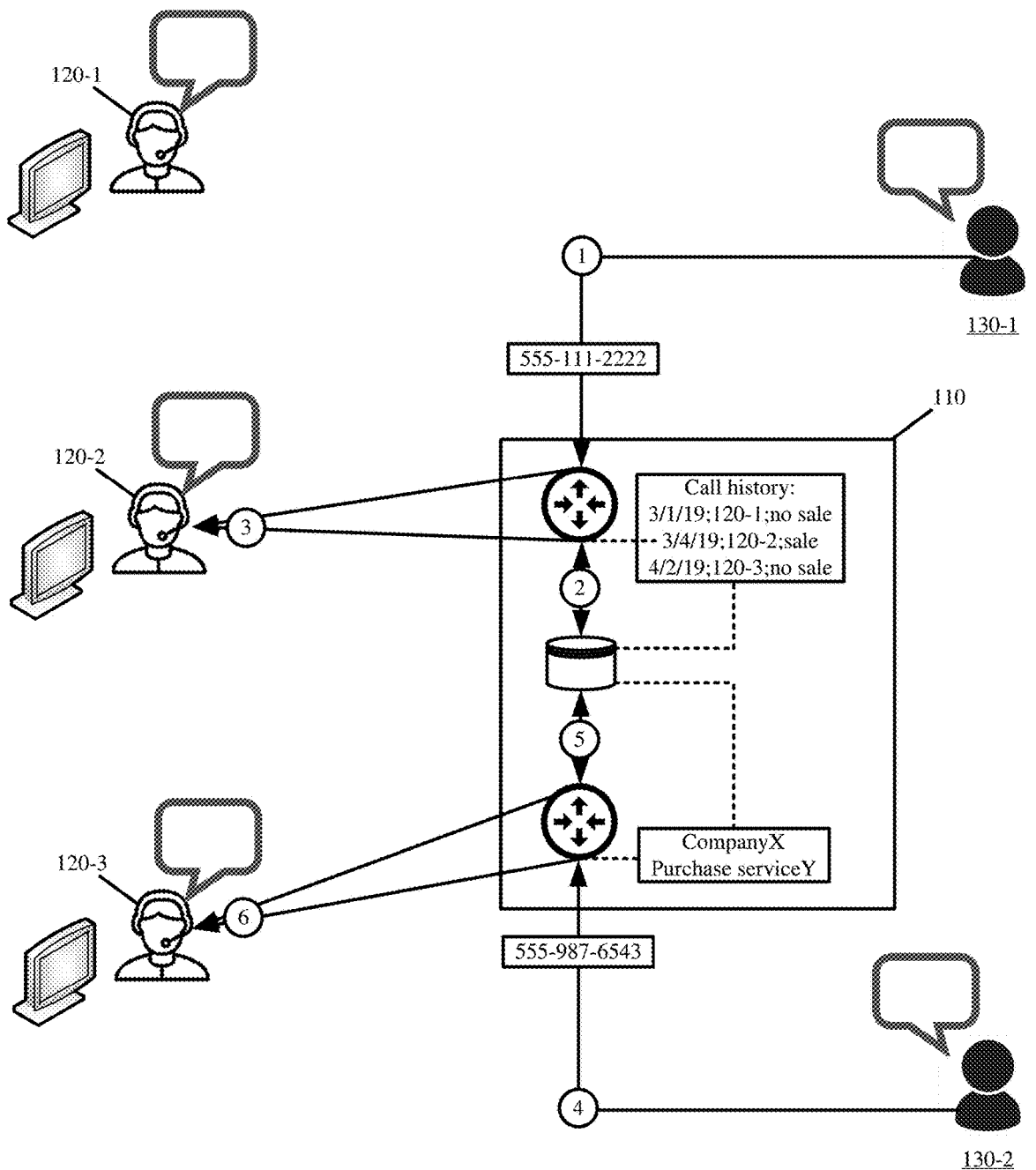
FIG. 9 illustrates an example of the predictive call routing performed by the adaptive conversational system in accordance with some embodiments presented herein.

FIG. 9 illustrates an example of the predictive call routing performed by adaptive conversational system 110 in accordance with some embodiments presented herein. Adaptive conversational system 110 receives (at 1) a first inbound call from participant 130-1 at first time.

Adaptive conversational system 110 may use the telephone number or other information provided with the first inbound call to obtain (at 2) prior interactions that have been had with participant 130-1 and/or other identifying information about participant 130-1. In this figure, adaptive conversational system 110 obtains (at 2) information indicating that participant 130-1 has previously been on calls with first telephone agent 120-1, second telephone agent 120-2, and third telephone agent 120-3, but that only the call with second telephone agent 120-2 resulted in a positive disposition. Accordingly, adaptive conversational system 110 routes (at 3) the first inbound call from participant 130-1 to second telephone agent 120-2, and second telephone agent 120-2 begins a conversation with participant 130-1.

Adaptive conversational system 110 may also receive (at 4) a second inbound call from participant 130-2 at a second time. Adaptive conversational system 110 obtains (at 5) identifying information about participant 130-2 from one or more internal or external databases prior to connecting the second inbound call to one of the available telephone agents 120. In this example, adaptive conversational system 110 performs a lookup of the participant 130-2 telephone number to determine that participant 130-2 is a particular company that is likely to call for assistance on a specific service previously purchased by the particular company.

Adaptive conversational system 110 determines that third telephone agent 120-3 of all telephone agents 120 is best suited to discuss the specific service. For instance, third telephone agent 120-3 may have the highest percentage of positive dispositions on calls directed to the specific service, may have resolved the most number of issues on the specific service, may have the most training or experience on the specific service, or is otherwise most effective at disposing calls directed to the specific service. Accordingly, adaptive conversational system 110 may route (at 6) the second inbound call to third telephone agent 120-3, and telephone agent 120-3 may commence the conversation with second participant 130-2.

Figure 10:
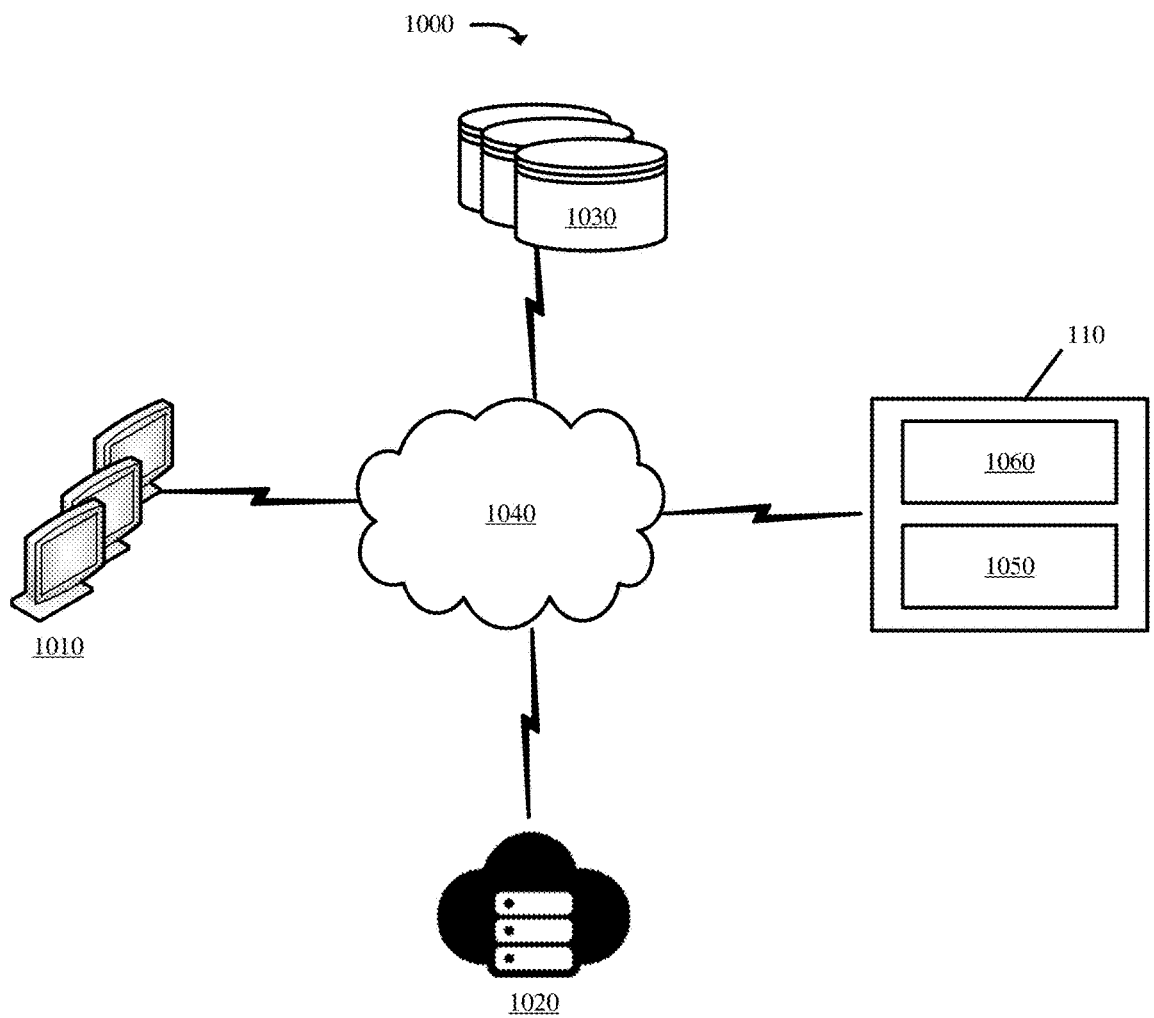
FIG. 10 illustrates an example environment in which one or more embodiments, described herein, may be implemented.

FIG. 10 illustrates an example environment 1000 in which one or more embodiments, described herein, may be implemented. As shown in FIG. 10, environment 1000 may include adaptive conversational system 110, call control devices 1010 used by telephone agents 120, support devices 1020, one or more databases 1030, and network 1040.

The quantity of devices, components, and/or networks, illustrated in FIG. 10, is provided for explanatory purposes only. In practice, environment 1000 may include additional devices, components, and/or networks; fewer devices, components, and/or networks; different devices, components, and/or networks; or differently arranged devices, components, and/or networks than illustrated in FIG. 10. One or more of the devices of environment 1000 may perform one or more functions described as being performed by another one or more of the devices of environment 1000. Devices of environment 1000 may interconnect with each other and/or other devices via wired connections, wireless connections, or a combination of wired and wireless connections. In some implementations, one or more devices of environment 1000 may be physically integrated in, and/or may be physically attached to, one or more other devices of environment 1000. For instance, adaptive conversational system 110 may be implemented on one or more of support devices 1030.

Adaptive conversational system 110 may include one or more devices that monitor and control different simultaneous conversations within one or more entities (e.g., companies or businesses) according to the embodiments described above. Adaptive conversational system 110 may be integrated as part of an intelligent softphone solution, telephony services, sales solutions, and/or other suite of services. Accordingly, adaptive conversational system 110 may be configured with access to other systems and databases 1030 of an entity, and may obtain information from those systems and databases 1030. Adaptive conversational system 110 may be located on-premises (e.g., at a business location) or may be implemented in the "cloud" remote from the entity using conversation monitoring and control services of adaptive conversational system 110.

In some embodiments, adaptive conversational system 110 may include conversation element extraction engine 1050 and rule execution engine 1060. Conversation element extraction engine 1050 and rule execution engine 1060 may be components executed on adaptive conversational system 110 hardware, or may include different devices of adaptive conversational system 110.

Conversation element extraction engine 1050 may obtain real-time feeds of each conversation involving a telephone agent 120. Conversation element extraction engine 1050 may obtain the feeds via a connection to call control devices 1020 used by telephone agents 120 to make or receive telephone calls.

Conversation element extraction engine 1050 may extract conversation elements from each conversation as the conversation unfolds. For instance, conversation element extraction engine 1050 may produce a transcript of each conversation as each word is spoken using speech recognition services. Conversation element extraction engine 1050 may also analyze the dialog to extract sentiment, tone, behavior, workflow progression, call disposition, timing, and/or other metrics or insight from different points of a conversation. In some embodiments, each extracted conversation element may be tagged to a speaker (e.g., telephone agent 120 or participant 130) and may also be tagged with a timestamp to identify the point in the conversation where the conversation element was extracted.

Conversation element extraction engine 1050 may store a recording of each conversation along with the conversation elements extracted from each conversation in databases 1030. Conversation element extraction engine 1050 may also provide the extracted conversation elements for each conversation to rule execution engine 1060 in real-time (e.g., as the conversation elements are extracted from a current point in a conversation).

Rule execution engine 1060 may receive the conversation elements extracted by conversation element extraction engine 1050, and may compare the conversation elements from a conversation to defined triggers of different rules. When the conversation elements extracted from a current point in a conversation satisfy a rule trigger, rule execution engine 1060 invokes that rule. As part of invoking the rule, rule execution engine 1060 may execute one or more actions defined for invoked rule.

As noted above, executing the actions may include sending alerts or data to a corresponding call control device 1010 of the telephone agent 120 engaged in the conversation that invoked the rule. Executing the actions may also include sending alerts or data to call control devices 1010 of other entities (e.g., managers, supervisors, etc.) or changing operation of call control devices 1010 to implement a direct change to the conversation (e.g., inserting a prompt into the conversation, connecting a new call participant, routing the conversation to a different telephone agent, etc.).

Rule execution engine 1060 may store or access rules from databases 1030, and/or may log rule effectiveness as well as other metrics in databases 1030. Rule execution engine 1060 may use the logged metrics to determine whether rules should be replaced or modified. For instance, rule execution engine 1060 may perform machine learning and/or artificial intelligence over the logged metrics in databases 1030 to analyze the effectiveness of a rule in reaching a desired positive disposition, and to determine new triggers and/or actions for a modified or new rule to more effectively reach the desired positive disposition.

In some embodiments, conversation element extraction engine 1050 and rule execution engine 1060 may use support devices 1020 for conversation element extraction and/or rule invocation. Support devices 1020 may include a set of cloud resources that can be dynamically scaled and put in use based on the number of simultaneous conversations. For instance, each call control device 1020 may feed the audio stream from an active conversation to conversation element extraction engine 1050. Conversation element extraction engine 1050 may then initiate an extraction instance on support devices 1020 for each active conversation, and may provide an audio stream to the initiated extraction instance. The initiated extraction instance may include a virtual machine or executable service that extracts conversation elements from a provided audio stream, and that provides the extracted conversation elements back to conversation element extraction engine 1050. In this manner, conversation element extraction engine 1050 may use a set of extraction instances running on support devices 1020 to simultaneously extract conversation elements from a set of conversations in parallel. Similarly, rule execution engine 1060 may initiate a different rule matching instance on support devices 1020 to determine if the extracted conversation elements from a particular conversation invoke any defined rules, and to execute the actions of a rule matched to the conversation elements of a stream. In some embodiments, the rule matching instance may execute on the same support device 1020 executing an extraction instance for the same conversation or audio stream.

Call control devices 1010 may include softphones or other devices that telephone agents 120 use for call purposes. Call control devices 1010 may provide a dialer that initiates and establishes calls and/or conversations with different participants 130. Call control devices 1010 may include a display for presenting information about the participant 130 on the call. Call control devices 1010 may also connect to adaptive conversational system 110 over network 1040 to receive messaging and/or controls from adaptive conversational system 110. The messaging can be used to update the display of call control devices 1010, and provide real-time instructions or commands to control a conversation while telephone agent 120 is engaged in that conversation. Adaptive conversational system 110 can also control the operation of call control devices 1010 in order to route calls, connect calls, add participants to call, insert audible prompts in an active call, and/or perform other operations.

Network 1040 facilitates the intercommunication between adaptive conversational system 110 and call control devices 1010, support devices 1020, and databases 1030. Network 1040 may include a Local Area Network ("LAN"), a private enterprise network, a core network of a wireless telecommunications network, an Internet Protocol-based packet data network ("PDN"), a wide area network ("WAN") such as the Internet, and/or one or more other networks.

Figure 11:
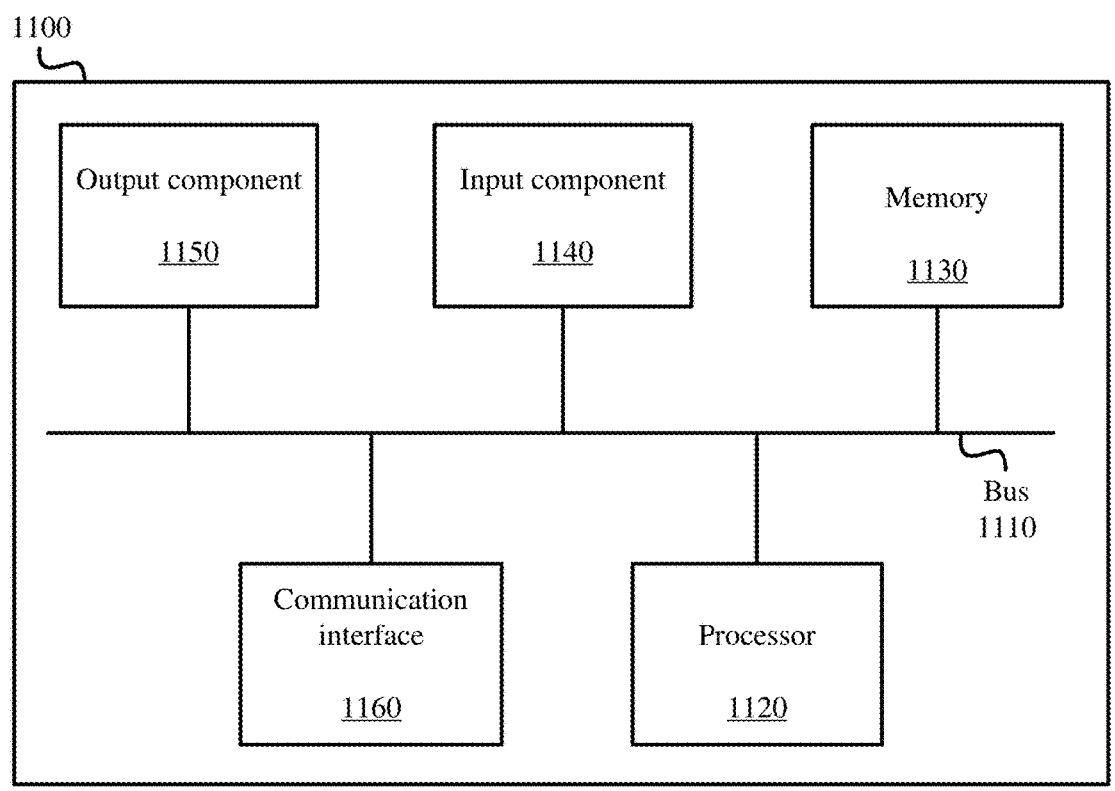
FIG. 11 illustrates example components of one or more devices, according to one or more embodiments described herein.

FIG. 11 is a diagram of example components of device 1100. Device 1100 may be used to implement adaptive conversational system 110, call control devices 1010, support devices 1020, databases 1030, extraction instances, rule matching instances, and/or other instances for performing the machine learning and/or artificial intelligence described above. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
monitoring, at an adaptive conversational device, an audio stream from each of a plurality of simultaneously active conversations;
extracting, by operation of the adaptive conversational device, a different set of conversation elements from a current point in each active conversation;
invoking, by operation of the adaptive conversational device, a first rule from a plurality of rules in response to a subset of a first set of conversation elements satisfying a trigger of the first rule when the current point of a first active conversation from the plurality of simultaneously active conversations is at a first time in the first active conversation, and wherein the first set of conversation elements are extracted from the first active conversation at the first time; and
controlling, by operation of the adaptive conversational device, the first active conversation according to one or more actions of the first rule being invoked at the first time corresponding to the current point in the first active conversation where the subset of the first set of conversation elements satisfy the trigger of the first rule.

2. The method of claim 1, wherein extracting the different set of conversation elements comprises:
identifying, at the current point in the first active conversation, two or more of (i) spoken words, (ii) sentiment of a speaker, (iii) call behavior of the speaker, and (iv) workflow state.

3. The method of claim 1 further comprising:
connecting each active conversation of the plurality of simultaneously active conversations to the adaptive conversational device; and
providing a real-time feed of the audio stream from each active conversation to the adaptive conversational device for conversation element extraction.

4. The method of claim 1 further comprising:
initiating a different conversation extraction instance for each active conversation of the plurality of simultaneously active conversations at the adaptive conversational device;
providing a real-time feed of the audio stream from a different active conversation of the plurality of simultaneously active conversations to a different conversation extraction instance; and
receiving, at the adaptive conversational device, a different set of conversation elements from each conversation extraction instance.

5. The method of claim 1 further comprising;
detecting, by operation of the adaptive conversational device, a particular issue in the first active conversation at the first time in response to the subset of the first set of conversation elements satisfying the trigger of the first rule and the subset of the first set of conversation elements identifying the particular issue;
retrieving, by operation of the adaptive conversational device, a script defined to resolve the particular issue from a plurality of scripts in response to invoking the first rule; and wherein controlling the first active conversation comprises presenting the script at the first time to a telephone agent that is troubleshooting the particular issue and that is engaged in the first active conversation.

6. The method of claim 1 further comprising;
detecting, by operation of the adaptive conversational device, that the first active conversation does not satisfy a compliance requirement in response to the subset of the first set of conversation elements satisfying the trigger of the first rule;
determining, by operation of the adaptive conversational device, the one or more actions that satisfy the compliance requirement in response to invoking the first rule; and
wherein controlling the first active conversation comprises executing the one or more actions at the first time of the first active conversation.

7. The method of claim 6, wherein executing the one or more actions comprises:
prompting a telephone agent engaged in the first active conversation to recite a particular set of words that satisfy the compliance requirement.

8. The method of claim 6, wherein executing the one or more actions comprises:
playing a prompt at the first time during the first active conversation between at least two participants, wherein the prompt comprises a particular set of words that satisfy the compliance requirement.

9. The method of claim 6 further comprising:
determining, by operation of the adaptive conversational device, that the compliance requirement is satisfied at a later second time in the first active conversation in response to a subset of a second set of conversation elements extracted at the second time from the first active conversation satisfying a trigger of a different second rule of the plurality of rules; and
logging, at the adaptive conversational device, a timestamp corresponding to the second time in the first active conversation where the compliance requirement is satisfied in conjunction with the first active conversation.

10. The method of claim 9 further comprising:
determining, by operation of the adaptive conversational device, that the compliance requirement is satisfied at the first time in a different second active conversation of the plurality of simultaneously active conversations based on a subset of a third set of conversation elements extracted at the first time from the second active conversation; and
logging, at the adaptive conversational device, a timestamp corresponding to the first time in the second active conversation where the compliance requirement is satisfied in conjunction with the second active conversation and the subset of the third set of conversation elements satisfying the compliance requirement.

11. The method of claim 1 further comprising;
detecting, by operation of the adaptive conversational device, a timestamp at which each active conversation of the plurality of simultaneously active conversations satisfies a compliance requirement in response to a subset of the different sets of conversation elements extracted from different times in each active conversation satisfying a trigger of a second rule from the plurality of rules; and
storing, by operation of the adaptive conversational device, the timestamp at which each particular active conversation satisfies the compliance requirement according to one or more actions of the second rule being invoked at a time in the particular active conversation where the second is invoked.

12. The method of claim 1 further comprising:
detecting, by operation of the adaptive conversational device, a request made by a speaker engaged in the first active conversation at the first time in response to the subset of the first set of conversation elements satisfying the trigger of the first rule;
querying, by operation of the adaptive conversational device, a database for a set of supplemental information addressing the request in response to invoking the first rule; and
wherein controlling the first active conversation comprises providing the set of supplemental information at the first time to a telephone agent that responds to the request made by the speaker at the first time in the first active conversation.

13. The method of claim 1 further comprising:
detecting, by operation of the adaptive conversational device, an issue in the first active conversation between a telephone agent and a participant at the first time in response to the subset of the first set of conversation elements satisfying the trigger of the first rule;
identifying, by operation of the adaptive conversational device, a supervisor associated with the issue or the telephone agent in response to invoking the first rule; and
wherein controlling the first active conversation comprises:
alerting the supervisor as to the issue; and
providing the supervisor with a link to connect to the current point in the first active conversation.

14. The method of claim 1 further comprising:
invoking, by operation of the adaptive conversational device, a different second rule from the plurality of rules in response to a subset of a second set of conversation elements satisfying a trigger of the second rule when the current point of the first active conversation is at a different second time in the first active conversation, and wherein the second set of conversation elements are extracted from the first active conversation at the second time; and
controlling, by operation of the adaptive conversational, the first active conversation according to one or more actions of the second rule being invoked at the second time corresponding to the current point in the first active conversation where the subset of the second set of conversation elements satisfy the trigger of the second rule.

15. The method of claim 1 further comprising:
invoking, by operation of the adaptive conversational device, a second rule from the plurality of rules in response to a subset of a second set of conversation elements satisfying a trigger of the second rule when the current point of a second active conversation from the plurality of simultaneously active conversations is at the first time in the second active conversation, and wherein the second set of conversation elements are extracted from the second active conversation at the first time; and
controlling, by operation of the adaptive conversational device, the second active conversation according to one or more actions of the second rule being invoked at the first time corresponding to the current point in the second active conversation where the subset of the second set of conversation elements satisfy the trigger of the second rule.

16. The method of claim 1 further comprising:
tracking, by operation of the adaptive conversational device, effectiveness of the first rule in achieving a desired disposition after controlling the first active conversation;
determining, by operation of the adaptive conversational device, that the effectiveness of the rule is less than a threshold;
identifying, by operation of the adaptive conversational device, one or more conversation elements and actions producing the desired disposition that are different than conversation elements defining the trigger of the first rule and the one or more actions of the first rule; and
replacing, by operation of the adaptive conversational device, the first rule with a second rule comprising a trigger defined with the one or more conversation elements producing the desired disposition, and the one or more actions producing the desired disposition.

17. A non-transitory computer-readable medium, storing a set of processor-executable instructions, which, when executed by one or more processors, cause the one or more processors to:
monitor an audio stream from each of a plurality of simultaneously active conversations;
extract a different set of conversation elements from a current point in each active conversation;
invoke a first rule from a plurality of rules in response to a subset of a first set of conversation elements satisfying a trigger of the first rule when the current point of a first active conversation from the plurality of simultaneously active conversations is at a first time in the first active conversation, and wherein the first set of conversation elements are extracted from the first active conversation at the first time; and
control the first active conversation according to one or more actions of the first rule being invoked at the first time corresponding to the current point in the first active conversation where the subset of the first set of conversation elements satisfy the trigger of the first rule.

18. A system comprising:
a plurality of call control devices used to establish a plurality of simultaneously active conversations between a plurality of telephone agents and different participants;
an adaptive conversational device monitoring and control each of the plurality of simultaneously active conversations for quality control or compliance purposes, wherein adaptive conversational device comprises:
a non-transitory computer-readable medium storing a set of processor-executable instructions; and
one or more processors configured to execute the set of processor-executable instructions, wherein executing the set of processor-executable instructions causes the one or more processors to:
monitor an audio stream from each of a plurality of simultaneously active conversations;
extract a different set of conversation elements from a current point in each active conversation;
invoke a first rule from a plurality of rules in response to a subset of a first set of conversation elements satisfying a trigger of the first rule when the current point of a first active conversation from the plurality of simultaneously active conversations is at a first time in the first active conversation, and wherein the first set of conversation elements are extracted from the first active conversation at the first time; and
control the first active conversation according to one or more actions of the first rule being invoked at the first time corresponding to the current point in the first active conversation where the subset of the first set of conversation elements satisfy the trigger of the first rule.

19. The system of claim 18, wherein the processor-executable instructions further include processor-executable instructions to:
detect a particular issue in the first active conversation at the first time in response to the subset of the first set of conversation elements satisfying the trigger of the first rule and the subset of the first set of conversation elements identifying the particular issue;
retrieving a script defined to resolve the particular issue from a plurality of scripts in response to invoking the first rule; and
wherein the processor-executable instructions to control the first active conversation comprises processor-executable instructions to present the script at the first time on a call control device of a telephone agent that is troubleshooting the issue and that is engaged in the first active conversation.

20. The system of claim 18, wherein the processor-executable instructions further include processor-executable instructions to:
detect a request made by a speaker engaged in the first active conversation at the first time in response to the subset of the first set of conversation elements satisfying the trigger of the first rule;
query a database for a set of supplemental information addressing the request in response to invoking the first rule; and
wherein the processor-executable instructions to control the first active conversation comprises processor-executable instructions to provide the set of supplemental information at the first time on a call control device of a telephone agent that responds to the request made by the speaker at the first time in the first active conversation.

* * * * *